Nov. 26, 1957 E. C. JOHNSON 2,814,417
SEQUENTIAL FEEDING MECHANISM FOR VERTICALLY STACKED
CYLINDRICAL ARTICLES IN SIDE-BY-SIDE MAGAZINES
Filed March 11, 1954 2 Sheets-Sheet 1
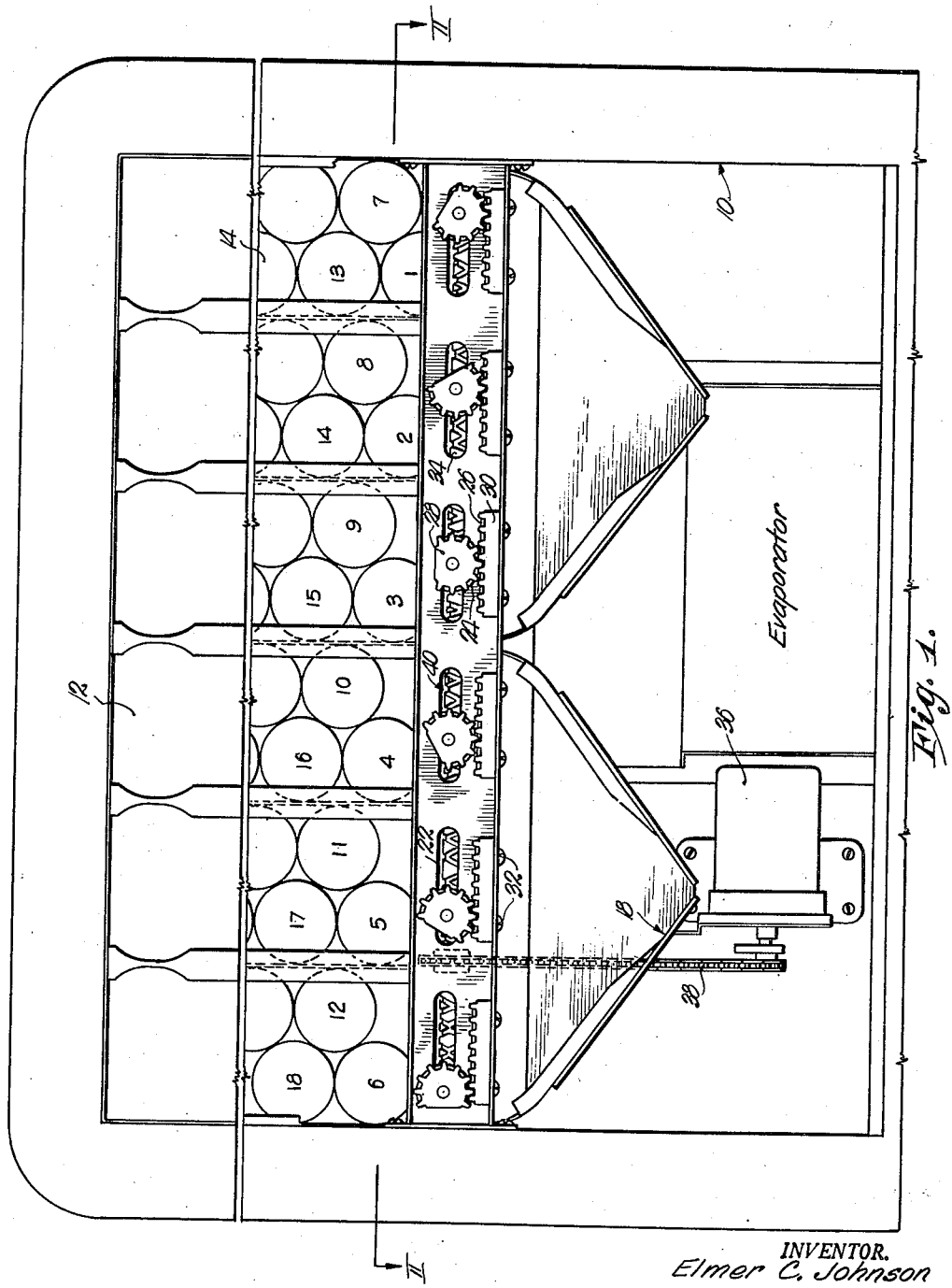
INVENTOR.
Elmer C. Johnson
BY
ATTORNEY.

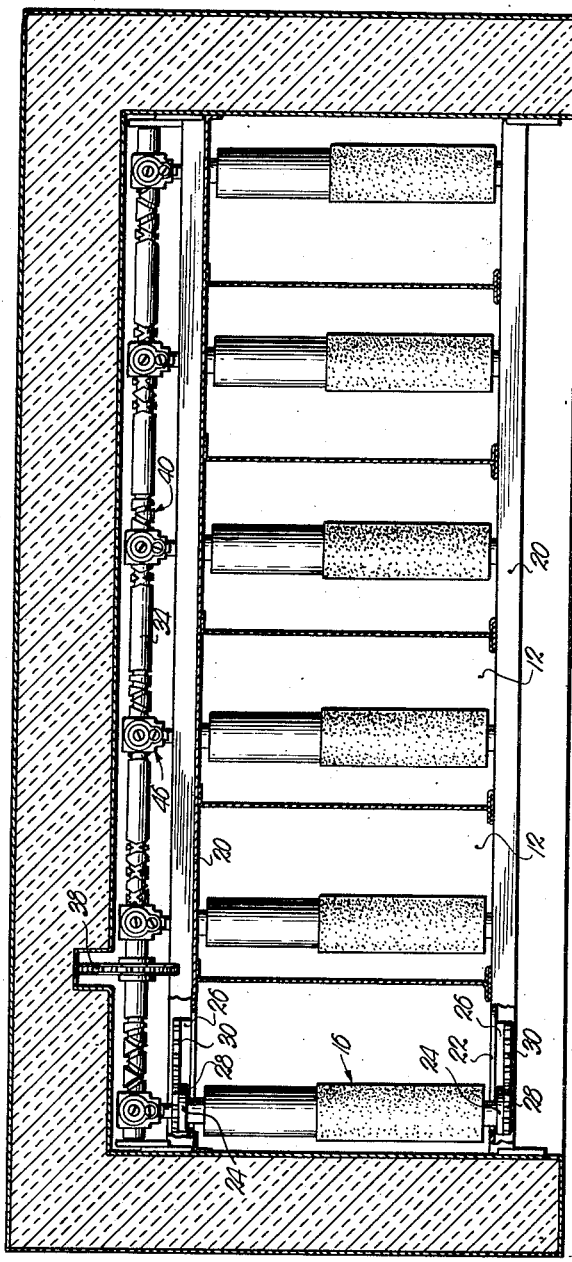
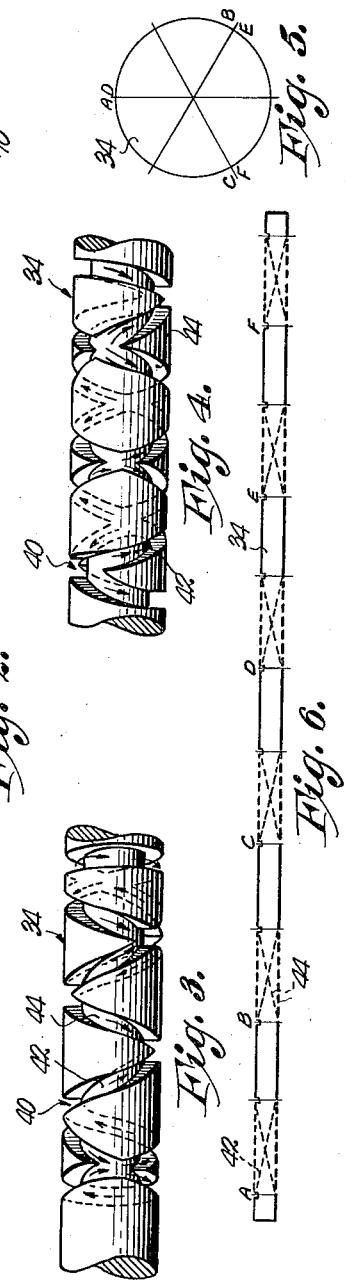

United States Patent Office 2,814,417
Patented Nov. 26, 1957

2,814,417

SEQUENTIAL FEEDING MECHANISM FOR VERTICALLY STACKED CYLINDRICAL ARTICLES IN SIDE-BY-SIDE MAGAZINES

Elmer C. Johnson, Kansas City, Mo., assignor to The Vendo Company, Kansas City, Mo., a corporation of Missouri Application March 11, 1954, Serial No. 415,573

11 Claims. (Cl. 221—67)

This invention relates to improvements in vending machines of the kind forming the subject matter of my United States Letters Patent, No. 2,585,012, dated February 12, 1952, the primary object of the present invention being to improve upon the bottle dispensing apparatus disclosed in said patent.

In my said patent there is disclosed a vending machine predicated upon the principle of providing a series of storage chambers for articles of vendible merchandise, each of the chambers or magazines being capable of receiving two columns of the articles in staggered relationship. Reciprocable rollers freely rotatable and disposed beneath the stacks, normally hold the articles of both stacks against gravitation, and upon reciprocation of the rollers a single bottle is vended to a receiving chute therebelow.

The means utilized in the said patent for reciprocating the rollers includes rotatable compound screws at the ends of the rollers and operably connected therewith by follower blocks.

The vending mechanism of the present invention follows the same principles, but by improvement thereon, having increased the overall capacity of the machine without increase in its dimensions, permitting the use of six chambers using the same space needed for a four chamber machine utilizing the principles of my patent.

It is the most important object of the present invention, therefore, to provide in a vending machine such as that disclosed in the above-identified patent, but including an operating shaft having a plurality of compound screws thereon, each having crisscross threads, the pitch of the threads progressively increasing in length in both directions so that the rate of reciprocation of the rollers is progressively increased in both directions.

Another important object of the present invention is to improve upon the supporting and actuating structures for rollers, and to this end there is included rack and gear means, together with wheels on the rollers riding along tracks disposed in parallelism with the paths of travel of the rollers.

Other objects include important details of construction, all of which will be made clear as the following specification progresses.

In the drawings:

Figure 1 is a fragmentary, front elevational view of sequential feeding mechanism for vertically stacked cylindrical articles in side-by-side magazines made pursuant to the present invention, the cabinet door being entirely removed to reveal details of construction.

Fig. 2 is a horizontal, cross-sectional view taken on line II—II of Fig. 1 but with the bottles shown in Fig. 1 entirely removed.

Fig. 3 is an enlarged, elevational view of one of the compound screws on the roller-actuating shaft.

Fig. 4 is a view similar to Fig. 3 but showing the said one compound screw with the shaft rotated 90°.

Fig. 5 is a schematic representation illustrating the various starting points of the plurality of compound screws; and Fig. 6 is a schematic representation showing the relative positions of the compound screws on the shaft.

Reference may be had to my patent above-identified for a complete understanding of the broad principles of operation of a staggered stack-type of article vending machine, particularly capable of dispensing cylindrical objects such as beverage bottles singly from the machine each time the vending mechanism is operated and preferably under control of coin mechanism not shown in the drawings and forming no part of the present invention.

The refrigerated cabinet broadly designated by the numeral 10, is provided with suitable structure subdividing the same into a series of storage chambers 12, each of which is adapted to receive two columns of articles 14 to be dispensed and arranged in staggered relationship as is clear in Fig. 1.

A horizontally reciprocable roller 16 is provided for each chamber 12 respectively and disposed below the columns of articles 14 to alternately engage the same and thereby normally restrain both columns from downward movement. Each time a roller 16 is moved however, to the end of its path of travel in one direction, an article 14 is dispensed to one of the underlying chutes 18 shown in Fig. 1 that serve to direct the vended article 14 to accessibility by the purchaser. In other words, each time each roller 16 completes a reciprocable cycle, a pair of articles 14 is released thereby.

Support means for the rollers 16 includes a pair of spaced-apart plates 20 between which the rollers 16 are disposed and each having a plurality of slots 22 for clearing the rollers 16 as the same reciprocate.

Rollers 16 are freely rotatable on their horizontal axes relative to the articles 14 as they reciprocate and are supported at the ends thereof by wheels 24 that ride along spaced horizontal tracks 26. This manner of supporting the rollers 16 is to be distinguished from the support means utilized in the dispensing apparatus of my said patent.

Additionally, it is to be noted in Fig. 2 of the drawings that the rollers 16 are driven from but one end thereof and, therefore, in order to assure that rollers 16 remain in parallelism as they are reciprocated, there is provided a gear segment 28 at each end thereof respectively, in mesh with an underlying rack 30. In actual practice, it is to be preferred that there be provided a pair of tracks 26 and a pair of racks 30 for each roller 16 respectively, the tracks being integral with the racks and each of such units being suitably mounted on the plates 20—20 by fastening elements 32.

The drive means is common to all of the rollers 16 and includes an elongated, horizontal shaft 34 suitably mounted in the cabinet 10 for rotation on its longitudinal axis and in substantial alignment with the rollers 16 at one end thereof. The shaft 34 may be rotated by a prime mover 36 in the cabinet 10 and operably coupled with the shaft 34 by coupling means that may include an endless chain 38.

Shaft 34 is provided with a compound screw broadly designated by the numeral 40 for each roller 16 respectively, each of which is provided with a pair of spiral, crisscross grooves 42 and 44 presenting left-hand and right-hand screw threads. Thus, through use of follower blocks 46 operably coupled with each roller 16 respectively and each in mesh with a corresponding screw 40, continuous rotation of the shaft 34 in one direction by operation of the prime mover 36 will cause all of the rollers 16 to reciprocate horizontally beneath the stacks of articles 14. However, the speed of advance of the followers 46 and therefore, of the rollers 16 is not uniform in accordance with the principles of the present invention. Instead, means is provided to progressively increase the rate of reciprocation of the rollers 16 in both directions and such means comprises forming the grooves 42 and 44 so that the pitch of the left-hand threads progressively increases in length in one direction along the shaft 34, and the pitch of the right-hand threads progressively decreases in length in said one direction along the shaft.

Assuming therefore, that a given follower 46 and its roller 16 is at one end of its path of travel, as soon as shaft 34 is rotated in one direction, the follower will advance toward the opposite end of its path of travel, its rate of movement being relatively slow at the start and progressively increasing as it reaches the said opposite end of its path of travel. An article 14 is then released and the follower returns to its point of beginning, slowly at first and most rapidly as it approaches a position for vending another article of merchandise 14. This action is true for all of the rollers 16 and the follower blocks 46 are so arranged on the shaft 34 so that articles 14 are first vended from one of the compartments 12 and thereupon successively from next adjoining compartments 12. A preferred succession of delivery of the articles 14 is indicated in Fig. 1 of the drawing with the articles 14 numbered for clearness from one (1) to 18 inclusive.

The grooves 42 of each compound screw 40 are offset 120° relative to the grooves 42 of the next adjacent screw 40. Similarly, the grooves 44 are offset 120° relatively. In other words, looking at Figs. 5 and 6 and assuming that the left-hand end of the grooves 42 are designated by the letters A, B, C, D, E and F respectively, it is seen that the left-hand end "A" of the first groove 42 is spaced 120° circumferentially of the shaft 34 from the left-hand end "B" of the next adjacent groove 42. End "B" commences 120° ahead of end "C," groove end "C" is 120° offset with respect to ends "A" and "D," and so on throughout the full length of the shaft 34.

The same is true of the grooves 44 but in the opposite direction. At the beginning of a complete cycle of operation therefore, article numbered 1 in Fig. 1, will be the first to be delivered to the underlying chute 18. During the next operation of the machine the shaft 34 must rotate 120° to vend the article of merchandise that is designated number 2 in Fig. 1. During each complete 360° rotation of the shaft 34 therefore, three articles of merchandise 14 are delivered to succeeding customers. Thus, shaft 34 must rotate through two cycles in order to deliver an article 14 from each of the chambers 12. It is to be further understood that by virtue of the controlled rate of reciprocation of the rollers 16, they move from one end of their paths of travel to the opposite end thereof only after two complete revolutions of the shaft 34. The roller 16 at the extreme left of Fig. 2 is shown substantially at the extreme left-hand end of its path of travel, whereas the roller 16 at the extreme right-hand end of Fig. 2 is shown nearing the right-hand end of its path of travel where the article numbered 1 in Fig. 1, is about to be delivered.

It is now clear from the foregoing that the primary object of the present invention, namely, that of increased capacity for a given vending machine dimension, has been made possible by controlled rate of reciprocation of the rollers 16 through variable pitch threads in the series of compound screws 40 on the shaft 34 and a tremendous improvement over the principles of my aforesaid patent has, therefore, been made.

It is also important to note that controlled rate of reciprocation permits positive holding of the bottle in place until the last movement of the screw which releases the bottle. Thus, until the last 120° rotation the roller is in sufficient engagement with the bottle to assure holding it in place and by virtue of the increase in speed toward the end of the cycle, the roller will move far enough to adequately clear the bottle so that the roller will not interfere with gravitation of the bottle.

Having thus described the invention what is claimed as new and desired to be secured by Letters Patent is:

1. In a vending machine of the kind having structure presenting a series of storage chambers, each provided with supporting and guiding means for receiving two columns of articles in staggered relationship, a reciprocable roller for each chamber respectively disposed below the columns of articles and adapted to alternately engage the columns to restrain both columns from downward movement, support means at each end respectively of the rollers for guiding the same along rectilinear paths of travel, a rotatable shaft, and a follower block mounted on one end of each roller respectively and operably connected to the shaft for release of the articles from the chambers as the shaft is rotated in one direction; mechanism for progressively increasing the rate of reciprocation of the rollers as the same move to each end of their paths of travel comprising a compound screw on the shaft for each block respectively in mesh therewith, each provided with a pair of spiral, crisscross grooves, presenting left-hand and right-hand screw threads, the pitch of the left-hand threads progressively increasing in length in one direction along the shaft and the right-hand threads progressively decreasing in length in said one direction along the shaft.

2. In a vending machine of the kind having structure presenting a series of storage chambers, each provided with supporting and guiding means for receiving two columns of articles in staggered relationship, a reciprocable roller for each chamber respectively disposed below the columns of articles and adapted to alternately engage the columns to restrain both columns from downward movement, support means at each end respectively of the rollers, each provided with a roller-clearance slot, a rotatable shaft, and a follower block mounted on one end of each roller respectively and operably connected to the shaft for release of the articles from the chambers as the shaft is rotated in one direction; mechanism for progressively increasing the rate of reciprocation of the rollers as the same move to each end of their paths of travel comprising a compound screw on the shaft for each block respectively in mesh therewith, each provided with a pair of spiral, crisscross grooves, presenting left-hand and right-hand screw threads, the pitch of the left-hand threads progressively increasing in length in one direction along the shaft and the right-hand threads progressively decreasing in length in said one direction along the shaft; wheel means mounted on each end respectively of each roller outside of said slots; and track means mounted on said support means separate from said slots and disposed in supporting relationship to said wheel means.

3. In a vending machine of the kind having structure presenting a series of storage chambers, each provided with supporting and guiding means for receiving two columns of articles in staggered relationship, a reciprocable roller for each chamber respectively disposed below the columns of articles and adapted to alternately engage the columns to restrain both columns from downward movement, support means at each end respectively of the rollers, each provided with a roller-clearance slot, a rotatable shaft, and a follower block mounted on one end of each roller respectively and operably connected to the shaft for release of the articles from the chambers as the shaft is rotated in one direction; mechanism for progressively increasing the rate of reciprocation of the rollers as the same move to each end of their paths of travel comprising a compound screw on the shaft for each block respectively in mesh therewith, each provided with a pair of spiral, crisscross grooves, presenting left-hand and right-hand screw threads, the pitch of the left-hand threads progressively increasing in length in one direction along the shaft and the right-hand threads progressively decreasing in length in said one direction along the shaft; gear means mounted on each end respectively of each roller; and rack means for said gear means in mesh therewith and mounted on said support means for guiding the rollers along rectilinear paths of travel.

4. In the invention as set forth in claim 3 wherein is provided wheel means mounted on each end respectively of each roller outside of said slots, and track means mounted on said support means separate from said slots and disposed in supporting relationship to said wheel means.

5. In the invention as set forth in claim 1 wherein the terminal ends of the threads of each screw are offset spirally relative to the threads of adjacent screws, and the blocks are disposed for successive release of the articles from the chambers as the shaft is rotated in said one direction.

6. In a vending machine of the kind having structure presenting a series of storage chambers, each provided with supporting and guiding means for receiving two columns of articles in staggered relationship, a roller for each chamber respectively disposed below the columns of articles, said rollers being mounted for reciprocable movement and being adapted to alternately engage the columns to restrain both columns from downward movement, a rotatable shaft, and a follower block mounted on one end of each roller respectively and operably connected to the shaft for release of the articles from the chambers as the shaft is rotated in one direction; mechanism for progressively increasing the rate of reciprocation of the rollers as the same move to each end of their paths of travel comprising a compound screw on the shaft for each block respectively in mesh therewith, each provided with a pair of spiral, crisscross grooves, presenting left-hand and right-hand screw threads, the pitch of the left-hand threads progressively increasing in length in one direction along the shaft and the right-hand threads progressively decreasing in length in said one direction along the shaft.

7. In a vending machine of the kind having structure presenting a series of storage chambers, each provided with supporting and guiding means for receiving two columns of articles in staggered relationship, a reciprocable roller for each chamber respectively disposed below the columns of articles and adapted to alternately engage the columns to restrain both columns from downward movement, a rotatable shaft, and a follower block mounted on one end of each roller respectively and operably connected to the shaft for release of the articles from the chambers as the shaft is rotated in one direction; mechanism for progressively increasing the rate of reciprocation of the rollers as the same move to each end of their paths of travel comprising a compound screw on the shaft for each block respectively in mesh therewith, each provided with a pair of spiral, crisscross grooves, presenting left-hand and right-hand screw threads, the pitch of the left-hand threads progressively increasing in length in one direction along the shaft and the right-hand threads progressively decreasing in length in said one direction along the shaft; wheel means mounted on each end respectively of each roller; and track means disposed in supporting relationship to said wheel means.

8. In a vending machine of the kind having structure presenting a series of storage chambers, each provided with supporting and guiding means for receiving two columns of articles in staggered relationship, a roller for each chamber respectively disposed below the columns of articles, said rollers being mounted for movement along reciprocable paths of travel and being adapted to alternately engage the columns to restrain both columns from downward movement, a rotatable shaft, and a follower block mounted on one end of each roller respectively and operably connected to the shaft for release of the articles from the chambers as the shaft is rotated in one direction; mechanism for progressively increasing the rate of reciprocation of the rollers as the same move to each end of their paths of travel comprising a compound screw on the shaft for each block respectively in mesh therewith, each provided with a pair of spiral, crisscross grooves, presenting left-hand and right-hand screw threads, the pitch of the left-hand threads progressively increasing in length in one direction along the shaft and the right-hand threads progressively decreasing in length in said one direction along the shaft; gear means mounted on each end respectively of each roller; and rack means for said gear means in mesh therewith for guiding the rollers along said reciprocable paths of travel.

9. In a vending machine of the kind having structure presenting a series of storage chambers, each provided with supporting and guiding means for receiving two columns of articles in staggered relationship, a reciprocable roller for each chamber respectively disposed below the columns of articles and adapted to alternately engage the columns to restrain both columns from downward movement, a rotatable shaft, and a follower block mounted on one end of each roller respectively and operably connected to the shaft for release of the articles from the chambers as the shaft is rotated in one direction; mechanism for progressively increasing the rate of reciprocation of the rollers as the same move to each end of their paths of travel comprising a compound screw on the shaft for each block respectively in mesh therewith, each provided with a pair of spiral, crisscross grooves, presenting left-hand and right-hand screw threads, the pitch of the left-hand threads progressively increasing in length in one direction along the shaft and the right-hand threads progressively decreasing in length in said one direction along the shaft; wheel means mounted on each end respectively of each roller; track means disposed in supporting relationship to said wheel means; gear means mounted on each end respectively of each roller; and rack means for said gears in mesh therewith for guiding the rollers as they reciprocate on said track means.

10. In a vending machine of the kind having structure presenting a series of storage chambers, each provided with supporting and guiding means for receiving two columns of articles in staggered relationship, a roller for each chamber respectively disposed below the columns of articles, said rollers being mounted for reciprocable movement and being adapted to alternately engage the columns to restrain both columns from downward movement, a rotatable shaft, and a follower block mounted on one end of each roller respectively and operably connected to the shaft for release of the articles from the chambers as the shaft is rotated in one direction; mechanism for progressively increasing the rate of reciprocation of the rollers as the same move to each end of their paths of travel comprising a compound screw on the shaft for each block respectively in mesh therewith, each provided with a pair of spiral, crisscross grooves, presenting left-hand and right-hand screw threads, the pitch of the left-hand threads progressively increasing in length in one direction along the shaft and the right-hand threads progressively decreasing in length in said one direction along the shaft, the terminal ends of the threads of each screw being offset spirally relative to the threads of adjacent screws.

11. In a vending machine of the kind having structure presenting a series of storage chambers, each provided with supporting and guiding means for receiving two columns of articles in staggered relationship, a roller for each chamber respectively disposed below the columns of articles, said rollers being mounted for reciprocable movement and being adapted to alternately engage the columns to restrain both columns from downward movement, a rotatable shaft, and a follower block mounted on one end of each roller respectively and operably connected to the shaft for release of the articles from the chambers as the shaft is rotated in one direction; mechanism for progressively increasing the rate of reciprocation of the rollers as the same move to each end of their paths of travel comprising a compound screw on the shaft for each block respectively in mesh therewith, each provided with a pair of spiral, crisscross grooves, presenting left-hand and right-hand screw threads, the pitch of the left-hand threads progressively increasing in length in one direction along the shaft and the right-hand threads progressively decreasing in length in said one direction along the shaft, the terminal ends of the threads of each screw being offset spirally relative to the threads of adjacent screws, said blocks being disposed for successive release of the articles from the chambers as the shaft is rotated in one direction.

References Cited in the file of this patent
UNITED STATES PATENTS

| | | |
|---|---|---|
| 1,110,616 | Fargeson | Sept. 15, 1914 |
| 2,585,012 | Johnson | Feb. 12, 1952 |